(12) United States Patent
Liu

(10) Patent No.: US 12,253,594 B2
(45) Date of Patent: Mar. 18, 2025

(54) STABLE RADAR TRACK VELOCITY INITIALIZATION USING MULTIPLE HYPOTHESES

(71) Applicant: Aptiv Technologies AG, Schaffhausen (CH)

(72) Inventor: Zixin Liu, Auburn Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 253 days.

(21) Appl. No.: 17/654,573

(22) Filed: Mar. 11, 2022

(65) Prior Publication Data

US 2023/0288556 A1 Sep. 14, 2023

(51) Int. Cl.
| | | |
|---|---|---|
| *G01S 13/931* | (2020.01) | |
| *G01S 7/41* | (2006.01) | |
| *G01S 13/58* | (2006.01) | |
| *G06N 5/04* | (2023.01) | |

(52) U.S. Cl.
CPC ............ *G01S 13/931* (2013.01); *G01S 7/415* (2013.01); *G01S 13/58* (2013.01); *G06N 5/041* (2013.01)

(58) Field of Classification Search
None
See application file for complete search history.

(56) References Cited

U.S. PATENT DOCUMENTS

| | | | | |
|---|---|---|---|---|
| 5,202,691 A | * | 4/1993 | Hicks ................... | G01S 13/726 342/90 |
| 5,325,098 A | * | 6/1994 | Blair ..................... | G01S 13/726 342/195 |
| 5,379,044 A | * | 1/1995 | Carlson ................ | G01S 13/726 342/90 |
| 5,414,643 A | * | 5/1995 | Blackman ............ | G01S 13/726 342/95 |
| 5,506,586 A | * | 4/1996 | Bull ...................... | G01S 7/2813 342/148 |
| 5,963,653 A | * | 10/1999 | McNary ................ | G01S 7/417 342/64 |
| 7,394,047 B1 | * | 7/2008 | Pedersen .............. | G01S 13/726 342/61 |

(Continued)

OTHER PUBLICATIONS

Entry for the word, "System" on dictionary.com; retrieved on Apr. 16, 2024. (Year: 2024).*

(Continued)

*Primary Examiner* — Bernarr E Gregory
(74) *Attorney, Agent, or Firm* — Harness, Dickey & Pierce, P.L.C.

(57) ABSTRACT

This document describes an object tracker that performs stable velocity initialization for radar tracks, using multiple hypotheses, including when only sparse radar point clouds are available. With just a single point per scan, the tracker creates multiple hypotheses for the direction and speed of an object. A least square function can be applied to each hypothesis to derive each respective initial velocity, which are tracked using a Kalman Filter during a hypotheses tracking period. When hypotheses are initialized and tracked on each hypothesis tracking period, their track error scores are computed. Based on their track error scores, the hypotheses that have low evidence are discarded during the hypotheses tracking period. When the hypotheses tracking period ends, a hypothesis with high evidence initializes the track's velocity. Parallel hypothesis evaluation enables the tracker to initialize a velocity quickly and accurately by merely selecting the best hypothesis, which may enable safer driving.

20 Claims, 5 Drawing Sheets

(56) References Cited

U.S. PATENT DOCUMENTS

| | | | |
|---|---|---|---|
| 7,473,876 B1* | 1/2009 | Pedersen | G01S 13/723 342/61 |
| 7,511,252 B1* | 3/2009 | Pedersen | G01S 13/723 342/61 |
| 2013/0035915 A1* | 2/2013 | Painsky | G01S 13/726 703/2 |
| 2016/0026184 A1 | 1/2016 | Olshansky et al. | |
| 2021/0233261 A1 | 7/2021 | Aeberhard et al. | |

OTHER PUBLICATIONS

European Patent Office Written Opinion for corresponding application 23159569.5; Jul. 11, 2023. (Year: 2023).*

European Patent Office Notice of Abandonment for corresponding application 23159569.5. (Year: 2024).*

Buhren, et al., "Initialization Procedure for Radar Target Tracking without Object Movement Constraints", Jul. 2007, 7 pages.

Davey, et al., "A Comparison of Track Initiation with PDAF and PMHT", 2002, pp. 320-324.

Davey, et al., "A Markov Model for Initiating Tracks with the Probabilistic Multi-Hypothesis Tracker", 2002, pp. 735-742.

Kellner, et al., "Instantaneous Lateral Velocity Estimation of a Vehicle using Doppler Radar", Jan. 2013, 9 pages.

Konopko, et al., "Multi-hypothesis Track Initialization with the Use of Multiple Trajectory Models", Jun. 2021, 10 pages.

Pursuant to MPEP § 2001.6(b) the applicant brings the following co-pending application to the Examiner's attention: U.S. Appl. No. 17/503,218.

"Extended European Search Report", EP Application No. 23159569.5, Jul. 11, 2023, 15 pages.

* cited by examiner

STABLE RADAR TRACK VELOCITY INITIALIZATION USING MULTIPLE HYPOTHESES

BACKGROUND

A perception system for a vehicle (e.g., advanced safety or automated driving system) may rely on an output from a radar tracker. Each track characterizes point clouds of radar returns detected over multiple frames, which can be grouped to represent an individual object. An initial velocity of a track can be derived based on point cloud detections, using position variances of the points measured over multiple frames. Care is taken to initialize track velocity measurements to be accurate as possible, otherwise, track splitting may occur. For instance, a reported object position may drift away from its true position if its velocity is incorrectly initialized. For objects that are further away, a sparse point cloud (e.g., a single point) may be all that is available for track generation, which makes velocity initialization difficult. To address this, filters or advanced algorithms may be used, including linear least square based algorithms like iterative least square, or normalized estimation error squared. However, results from using these techniques may be too unstable for use with vehicle controls, which expect tracks to be precise for safety. Further, even if an object is detectable at far range from a single point return, incorrect decisions from using incorrect assumptions about object position, direction, or speed can propagate downstream to users of the tracks, which can lead to unsafe or uncomfortable driving. Existing processes contribute to these problems by at least failing to provide consistent or stable results, which diminishes safety because an object cannot be accurately tracked.

SUMMARY

This document describes techniques and systems for stable radar track velocity initialization using multiple hypotheses. In one example, a method includes obtaining, by an object tracker and from a radar system, point cloud sensor data indicative of radar returns that reflect off of objects in an environment; and establishing, using the point cloud sensor data, a track to an object in the environment. The method includes initializing a velocity measurement for the object by creating multiple hypotheses for predicted movement of the object; determining, for each of the multiple hypotheses, an initial velocity and a first associated level of evidence supporting the initial velocity of that hypothesis, generating a fused hypothesis by combining the multiple hypotheses, an initial velocity and a first associated level of evidence of the fused hypothesis being based on an aggregate of the initial velocities and the first associated levels of evidence of the multiple hypotheses; including the fused hypothesis among the multiple hypotheses, and responsive to including the fused hypothesis among the multiple hypotheses, selecting, based on the first associated levels of evidence for the multiple hypotheses, a first best hypothesis for initializing the velocity measurement for the object.

In some examples, the above method further includes time updating the initial velocity of each of the multiple hypotheses, determining, for each of the multiple hypotheses, a second associated level of evidence supporting the updated initial velocity of that hypothesis, and eliminating from the multiple hypotheses any of the multiple hypotheses having values for the second associated level of evidence that do not satisfy an evidence threshold. In addition, responsive to determining that more than two hypotheses remain in the multiple hypotheses after eliminating any of the multiple hypotheses having values for the second associated levels of evidence that do not satisfy the evidence threshold, the above method further includes measurement updating the predicted movement of the object for each of the remaining multiple hypotheses, and selecting, based on the second associated levels of evidence for the remaining multiple hypotheses, a second best hypothesis to replace the first best hypothesis selected previously. Responsive to determining that only two hypotheses remain in the multiple hypotheses after eliminating any of the multiple hypotheses having values for the second associated levels of evidence that do not satisfy the evidence threshold, the above method further includes selecting, based on the second associated levels of evidence for the two hypotheses that remain, a third best hypothesis to replace the first or second best hypothesis selected previously, and outputting, for a vehicle system, the track to the object including a velocity parameter initialized to the initial velocity of the third best hypothesis.

Through implementation of these and other examples contemplated by this disclosure, stable radar track velocity initialization using multiple hypotheses can be achieved to initialize velocity measurements more accurately than from using other radar tracking techniques, even in cases where only a single point return is available each frame for an object being tracked. This Summary introduces simplified concepts for stable radar track velocity initialization using multiple hypotheses, for example, vehicles (e.g., trucks, automobiles) equipped with radar tracking to support driving, as well as other examples of object tracking, as further made clear from the Detailed Description and Drawings. This Summary is not intended to identify essential features of the claimed subject matter, nor is it intended for use in determining the scope of the claimed subject matter.

BRIEF DESCRIPTION OF THE DRAWINGS

The details for stable radar track velocity initialization using multiple hypotheses are described in this document with reference to the Drawings that may use same numbers to reference like features and components, and hyphenated numbers to designate variations of these like features and components. The Drawings are organized as follows:

FIG. 3-1 illustrates a flow diagram of an example process for stable radar track velocity initialization using multiple hypotheses.

FIG. 3-2 and FIG. 3-3 illustrate an example scenario of a host vehicle initializing radar track velocity measurements, in the context of FIG. 3-1.

DETAILED DESCRIPTION

Introduction

Figure 1:
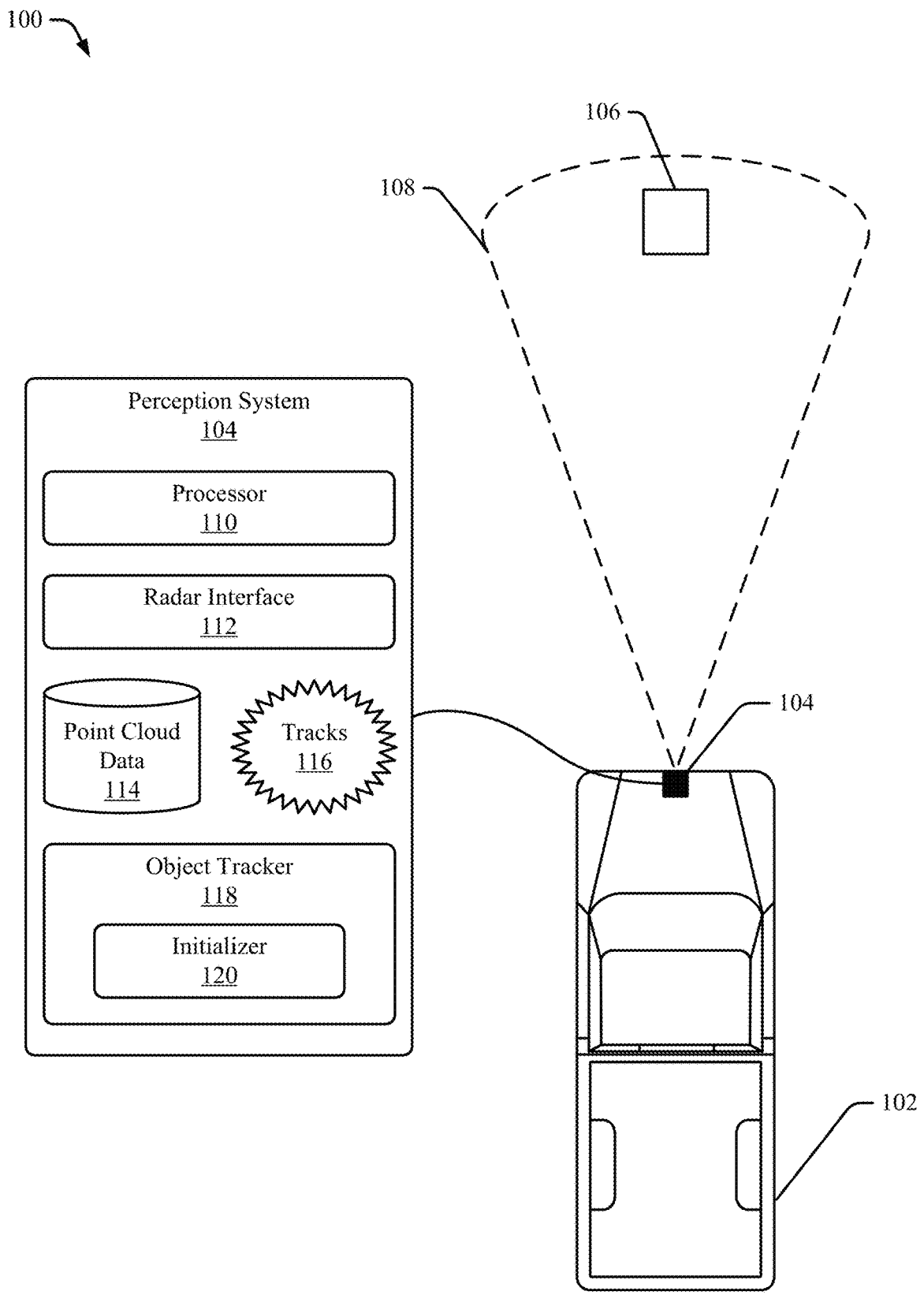
FIG. 1 illustrates an example environment for stable radar track velocity initialization using multiple hypotheses.

Radar systems measure velocity of a point on an object in a radial direction, this is referred to as range-rate. Multiple points (e.g., a radar point cloud) or multiple frames (e.g., scans of the radar) of measurements are needed to extract a velocity profile for an object. Radar systems often provide, during each frame or scan, a sparse point cloud (e.g., including only a few points) for some objects and may even provide only a single point detection objects that are far away, so called far range objects. With only a limited or single point in the radar point cloud, it is difficult to accurately initialize the velocity for a track. The number of radar points in one scan might not be enough to have a stable solution. In other words, the velocity computation may be erratic or not consistent with actual movement of the object.

A typical process for computing velocity includes solving a least square problem using range-rates and azimuth angles computed for different points within the radar point cloud. A change of positions of the points is calculated across two or more consecutive scans of the radar. However, instability in the velocity results from these existing techniques cannot provide a stable result that is accurate and predictable from one frame to the next. For example, when multiple the reflection points from an object are close to each other in position at every scan, the reflection points might actually contain nearly linear dependent information. However, if the reflection points are far away from each other at each scan, a change of position of those points from consecutive scans can yield a corrupted velocity because the extent of the object, which is also captured by the change of position, is typically ignored for simplicity. That is the change in position between two points may be seemingly impossible given limitations on size of other objects, especially vehicles, on a road. Existing algorithms and techniques may try to solve this problem by examining consistency of the change of position information of radar points from consecutive cycles to attempt to lower weightages of the inconsistent information in the ultimate assumption about the initial object motion and direction.

This document describes an object tracker that performs stable velocity initialization for radar tracks, using multiple hypotheses, including when only sparse radar point clouds are available. With just a single point per scan, the tracker creates multiple hypotheses for predicted movement of an object. A least square function can be applied to each hypothesis to derive each respective initial velocity, which are tracked using a Kalman Filter during a hypotheses tracking period. When hypotheses are initialized and tracked during the hypotheses tracking period, their track error scores are computed. The hypotheses that have low evidence (e.g., high error score) are discarded during the hypotheses tracking period. When the hypotheses tracking period ends, a single hypothesis with high evidence (e.g., low error score) is used to initialize the track's velocity. Parallel hypothesis evaluation enables the tracker to initialize track velocity quickly and accurately by merely selecting the best hypothesis, which may enable safer driving.

Example Environment

FIG. 1 illustrates an example environment 100 for stable radar track velocity initialization using multiple hypotheses, for example, by a vehicle 102. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like. The depicted environment 100 includes the vehicle 102 traveling on a roadway. The vehicle 102 is equipped with a perception system 104 for detecting an object 106 (or other like it) present on or near the roadway, which can impact how or whether the vehicle 102 can continue to travel.

The perception system 104 is used to relay information to other systems of the vehicle 102 about objects detected in the environment 100, such as an object 106 in a travel path of the vehicle 102. A region of interest associated with the perception system 104 at least partially surrounds the vehicle 102. This region, when monitored by the perception system 104, is referred to as a field of view 108 (also referred to as an instrumented field of view). The perception system 104 functions based on an input of point cloud sensor data, which can be obtained from a single type of sensor or a variety of different types of sensors. For ease of description, the point cloud sensor data obtained by the perception system 104 is described primarily as being radar data obtained from a radar system of the vehicle 102. The perception system 104 can be installed on, mounted to, or integrated with any part of the vehicle 102, such as in a front, back, top, bottom, or side portion of the vehicle 102, a bumper, a side mirror, part of a headlight and/or taillight, or at any other interior or exterior location of the vehicle 102 where object detection using point cloud sensor data is desired. Careful selection or re-positioning of components of the perception system 104 and/or the radar system to which it connects can further cause the field of view 108 to have a particular shape or size.

Included in the perception system 104 are a processor 110 and a radar interface 112. The processor 110 executes software and/or firmware that configures the perception system 104 to perform various functions in furtherance of object tracking. For example, information output from the processor 110 can take the form of tracks 116; each of the tracks 116 is to a different object detected in the field of view 108. The tracks 116 may include fields of information, including bounding box dimensions, size and position measurements, classifications, and other data characterizing a vehicle, pedestrian, traffic sign, or other object that appears in a region being monitored by the perception system 104. The processor 110 is configured to generate the tracks 116 based on point cloud sensor data 114 that the processor 110 receives from the radar interface 112.

The radar interface 112 can include a combination of hardware and software executing thereon or on the processor 110. The radar interface 112 operably connects the processor 110 of the perception system 104 to an output of a radar based sensor source, including the radar system of the vehicle 102 and/or external radar sources. The radar interface 112 may obtain point cloud sensor data from radar systems of other vehicles using vehicle-to-vehicle communications, e.g., for improving size or resolution of the field of view 108. The radar interface 112 may provide the point cloud sensor data in compressed or uncompressed form, or in any other format suitable for object tracking. A communication channel is shared between the radar interface 112 and a radar system. The communication channel can include an application programming interface (API), or other function executed by the processor 110. The radar interface 112 is one example sensor interface. Another interface to another type of sensor (e.g., lidar, camera) can also be used by the perception system 104 to obtain additional point cloud sensor data that is of a different sensor type.

An object tracker 118, including an initializer 120, is an example component of the perception system 104 that may be implemented at least partially in executable code that, when executed, configures the processor 110 to generate the tracks 116 to objects in the field of view 108. The tracks 116 are output from the object tracker 118 to other systems of the vehicle 102, which rely on the tracks 116 for situational awareness of potential obstacles. The initializer 120, when executed, configures the processor 110 to initialize a respective velocity of each of the tracks 116 in a stable manner, by using multiple hypotheses.

Relying on the initializer 120, the object tracker 118 is configured to perform stable velocity initialization for the tracks 116, using multiple hypotheses, including when only sparse radar point clouds are available. With just a single point per scan, the initializer 120 creates multiple hypotheses for direction and speed of an object. For instance, the object tracker 118 obtains from the radar interface 112, the point cloud sensor data 114, which is indicative of radar returns that reflect off of objects in the environment 100. The object tracker 118 performs object tracking techniques. Using the point cloud sensor data 114, a track to the object 106 is added to the tracks 116. However, rather than use other techniques to initialize a velocity measurement for the object 106, the initializer 120 is configured to initialize the velocity measurement more accurately and in a stable way. The initializer 120 is configured to create at least two hypotheses for predicted movement of the object 106. For each of the at least two hypotheses, an initial velocity and a first associated level of evidence supporting the initial velocity of that hypothesis is determined. The initializer 120 next generates a fused hypothesis by combining the at least two hypotheses. More specifically, the fused hypothesis includes an initial velocity and a first associated level of evidence of the fused hypothesis being based on an aggregate of the initial velocities and the first associated levels of evidence of the at least two hypotheses. The initializer 120 includes the fused hypothesis among the at least two hypotheses. A least square function can be applied by the initializer 120 to each hypothesis to derive each respective initial velocity.

Responsive to including the fused hypothesis among the at least two hypotheses, the initializer 120 is configured to select, based on the first associated levels of evidence for the at least two hypotheses, a single best hypothesis for initializing the velocity measurement for the object 106. For example, the initializer 120 updates the hypotheses using a Kalman Filter during a hypotheses tracking period. During the hypothesis tracking period, each of the hypotheses are initialized by the initializer 120 and tracked, which includes the initializer 120 computing their track error scores. The hypotheses that have low evidence (e.g., high error score) may be discarded during the hypotheses tracking period. When the hypotheses tracking period ends, a single hypothesis with high evidence (e.g., low error score) initializes the track's velocity. Parallel hypotheses evaluation performed by the initializer 120 in this way enables the object tracker 118 to quickly initialize a velocity of a track by merely selecting the best hypothesis, which ultimately enables safer driving because the tracks 116, which are used by other systems of the vehicle 102 for control or safety functions, include information more accurately, but as quick or nearly as fast as if initialized in other ways.

Example Vehicle Configuration

Figure 2:
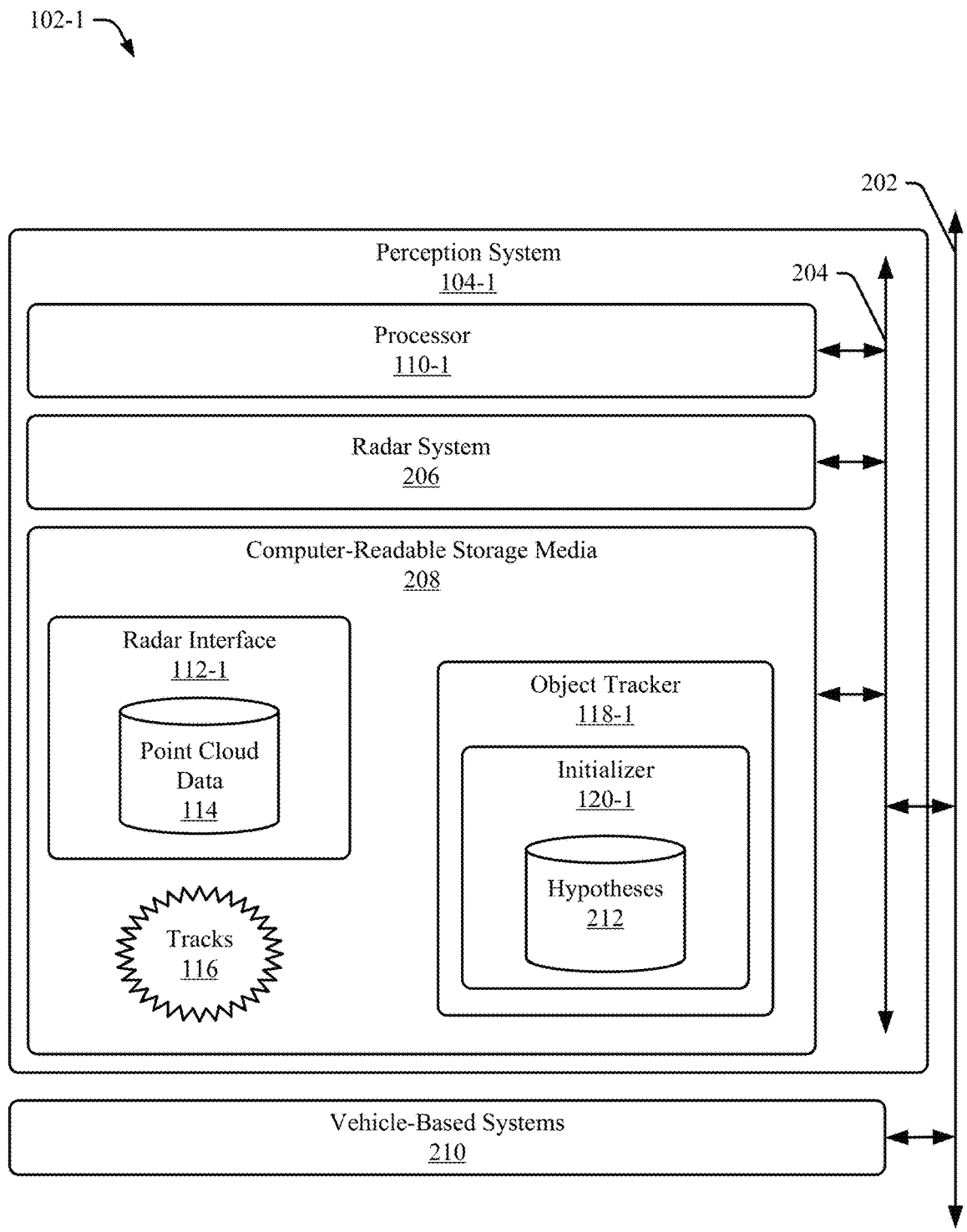
FIG. 2 illustrates an example vehicle including a system configured to perform stable radar track velocity initialization using multiple hypotheses.

FIG. 2 illustrates an example vehicle 102-1 including a system 104-1 configured to perform stable radar track velocity initialization using multiple hypotheses. The vehicle 102-1 is an example of the vehicle 102.

Included in the vehicle 102-1 is a perception system 104-1, which is an example of the perception system 104, shown in greater detail. The vehicle 102-1 also includes vehicle-based systems 210 that are operatively and/or communicatively coupled to the perception system 104-1 via link 202, which may be one or more wired and/or wireless links including vehicle-based network communications for interconnecting the components of the vehicle 102-1. In some examples, the link 202 is a vehicle communication bus.

The vehicle-based systems 210 use vehicle data, including object tracking data provided on the link 202 by the perception system 104-1, to perform vehicle-based functions, which in addition to other functions may include functions for vehicle control. The vehicle-based systems 210 can include any conceivable device, apparatus, assembly, module, component, subsystem, routine, circuit, processor, controller, or the like, which uses radar data to act on behalf of the vehicle 102-1. As some non-limiting examples, the vehicle-based systems 210 may include a system for autonomous control, a system for safety, a system for localization, a system for vehicle-to-vehicle communication, a system for use as an occupant interface, and a system for use as a multi-sensor tracker. Upon receipt of the object tracking data (e.g., the tracks 116), functions provided by the vehicle-based systems 210 use portions of the object tracking data, including velocity measurements of objects detected in the field-of-view 108, to configure the vehicle 102-1 to safely drive without colliding with the detected objects.

The tracks 116 are examples of the object tracking data that is output on the link 202 to the vehicle-based systems 210. One of the tracks 116 can include information about movement of the object 106, such as a velocity, position, and the like, to enable the vehicle-based systems 210 to control or assist with braking, steering, and/or accelerating the vehicle 102-1 to avoid a collision with the object 106. A system for autonomous control can use the tracks 116 received via the link 202 to autonomously or semi-autonomously drive the vehicle 102-1 safely on a road. A system for use as an occupant interface can use the information in the tracks 116 allow an operator or passengers to have situational awareness to make driving decisions or provide operator inputs to a controller for providing more buffer to avoid the objects. The tracks 116 or information contained therein may be provided to other vehicles using a system for vehicle-to-vehicle communication, to allow operators, passengers, or controllers of other vehicles to also avoid the objects being tracked or have confidence that the vehicle 102-1 is aware of their presence based on receipt of the tracks 116. By improving situational awareness for the vehicle 102-1 and other vehicles in the environment 100, the vehicle 102-1 can drive in a safer manner under manual, autonomous, or semi-autonomous control.

The perception system 104-1 includes a processor 110-1, as an example of the processor 110, a radar system 206, and a computer-readable medium (CRM) 208. The radar system 206 can include any quantity of radar devices, antennas, and other components to provide the point cloud sensor data 114 that covers the field of view 108. The radar system 206 may include a radar chip, an antenna or antenna array such as a multiple input multiple output (MIMO). The radar system 206 can include various transmitter/receiver elements, timing/control elements, and analog-to-digital converters. As already mentioned, although described primarily in the context of radar, other sensor systems may be adopted by the perception system 104-1 to perform point cloud based object tracking.

Some examples of the processor 110-1 include, a controller, a control circuit, a microprocessor, a chip, a system, a system-on-chip, a device, a processing unit, a digital signal processing unit, a graphics processing unit, and a central processing unit. The processor 110-1 may include multiple processors, one or more cores, embedded memory storing software or firmware, a cache or any other computer element that enables the processor 110-1 to execute machine-readable instructions for generating the tracks 116.

Machine-readable instructions that are executed by the processor 110-1 can be stored by the CRM 208. The CRM 208 may also be used to store data managed by the processor 110-1 during execution of the instructions. In some examples, the CRM 208 and the processor 110-1 are a single component, such as a system on chip including the CRM 208 configured as a dedicated storage for the processor 110-1. In some examples, access to the CRM 208 is shared by other components of the perception system 104-1 (e.g., the radar system 206) that are connected to the CRM 208. The processor 110-1 obtains instructions from the CRM 208; execution of the instructions configure the processor 110-1 to perform object tracking operations, such as radar based object tracking, which result in communication of the tracks 116 to the vehicle-based systems 210 and other components of the vehicle 102-1 over the link 202.

In this example, the CRM 208 includes instructions for configuring the processor 110-1 to provide a radar interface 112-1, which is an example of the radar interface 112. In addition, the CRM 208 includes instructions for executing an object tracker 118-1, including an initializer 120-1, which are examples of, respectively, the object tracker 118 and the initializer 120 from FIG. 1.

In operation, the object tracker 118-1 is configured to obtain from the radar interface 112-1, the point cloud sensor data 114 generated by the radar system 206. The point cloud sensor data 114 conveys information about radar returns detected from objects in the environment 100. The object tracker 118-1 is configured to process the point cloud sensor data 114 to establish the tracks 116; with each of the tracks 116 corresponding to a particular object in the environment 100. As the object tracker 118-1 generates the tracks 116, they are reported to the vehicle-based systems 210. In establishing each of the tracks 116, the object tracker 118-1 calls on the initializer 120-1 to initialize a velocity measurement for each track prior to that track being introduced into the tracks 116.

To initialize the velocity measurement of one of the tracks 116, the initializer 120-1 generates and maintains hypotheses 212, which are based in part on solutions to least linear square (LLS) problems. Solving the LLS problems is simplified by being based on a weighted least square principle. The hypotheses 212 initially include at least two hypotheses corresponding to solutions of different LLS problems, and another hypothesis derived from fusing the solutions of all the different LLS problems into one. For example, the hypotheses 212 may be derived from solving seven different LLS problems to capture seven different potential radar point distributions possible from the point cloud sensor data 114. The seven LLS problems produce seven solutions, which correspond to seven of the hypotheses 212. An eighth hypothesis is added to the hypotheses 212, and, as described below in greater detail, is formed from fusing the seven solutions. Then, a high degree of accuracy is achieved from tracking, for just a short time, the hypotheses 212 in order to select a best one.

After the initializer 120-1 establishes the hypotheses 212, the velocity measurement of the tracks 116 is still not initialized, immediately. Instead, all the hypotheses 212 are tracked using a motion model (e.g., a simple constant motion model) for a few frames or scans of the radar system 206 (e.g., less than or equal to eight scans). The quantity of frames scanned when tracking the hypotheses 212 may be tunable or adjusted for different modes or characteristics of the radar system 206, the perception system 104-1, and/or the vehicle 102-1. During each scan of this hypotheses tracking period, a track error score is computed and assigned to each of the hypotheses 212.

The track error score is computed based on an accumulated error between each of the hypotheses 212 and the velocity measurement associated to the best hypothesis. The track error score is used by the initializer 120-1 to select the best hypothesis to use for initializing the velocity measurement of one of the tracks 116. Unlike other hypothesis tracking techniques that consider associations between every hypothesis and all measurements at every scan, complexity of velocity initialization is reduced. Rather than consider every association at each scan, the initializer 120-1 is configured to only considers a single best association per scan. The track error score enables the initializer 120-1 to arrive at the single best hypothesis sooner by eliminating, after each scan of the hypotheses tracking period, each of the less likely hypotheses from the hypotheses 212 until arriving at one.

After the initializer 120-1 determines the velocity measurement of a new track, it is added to the tracks 116. The tracks 116 may be measurement updated for a current track reporting period. By using the velocity measurement from the initializer 120-1, the tracks 116 can be output with high accuracy and low latency. This may enable the vehicle-based systems 210 that receive the tracks on the link 202 to perform functions of the vehicle 102-1 with increased safety and greater precision.

Process of Stable Radar Track Velocity Initialization Using Multiple Hypotheses

Figures 1, 3:
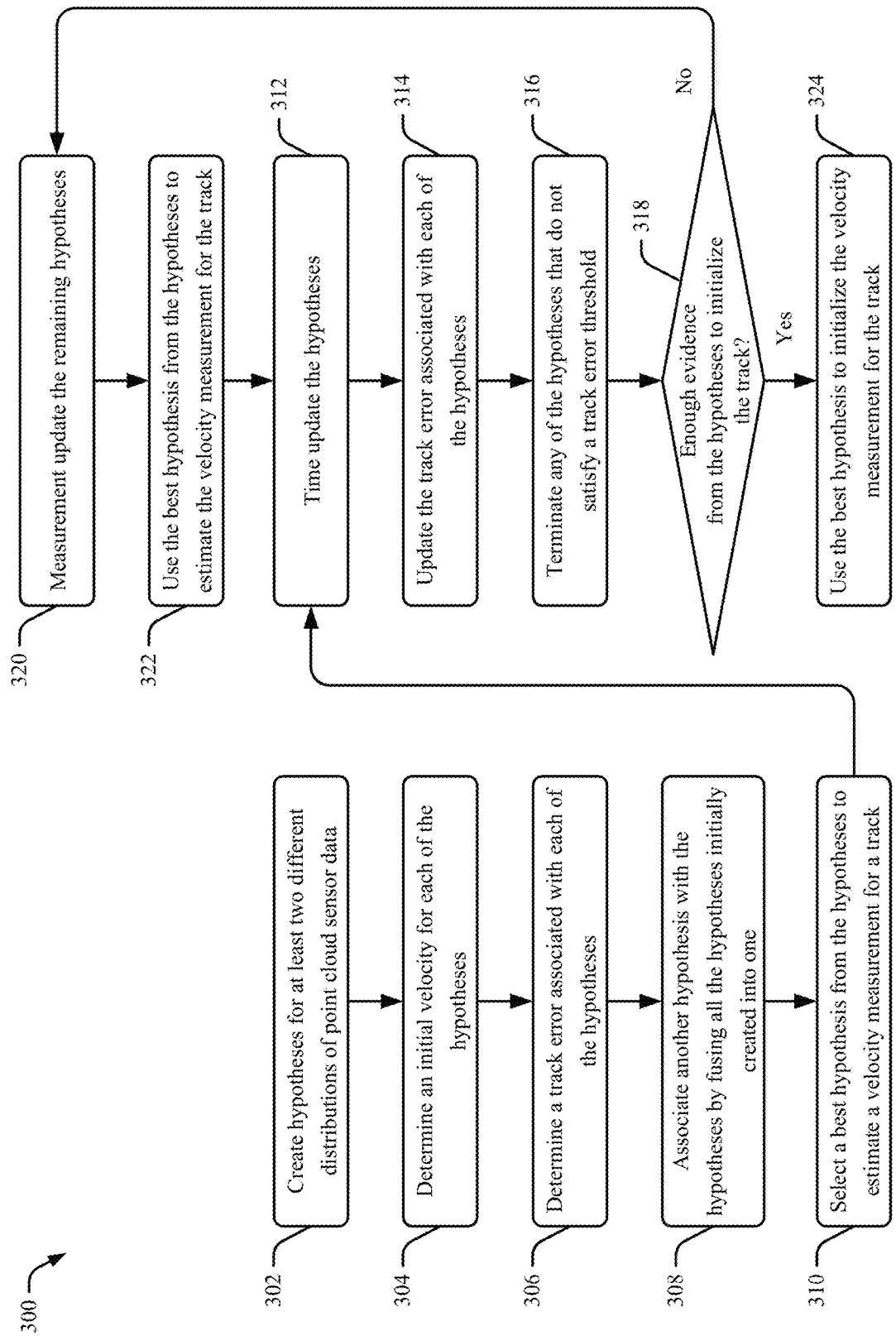
Figures 2, 3:
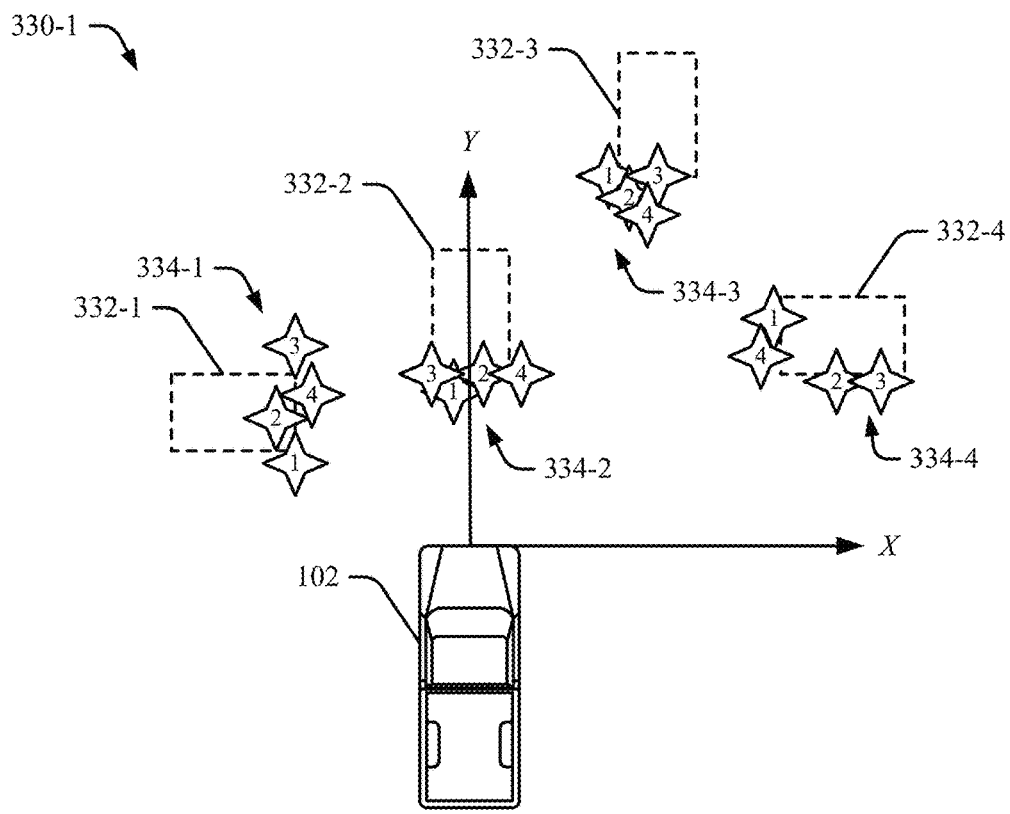
Figure 3:
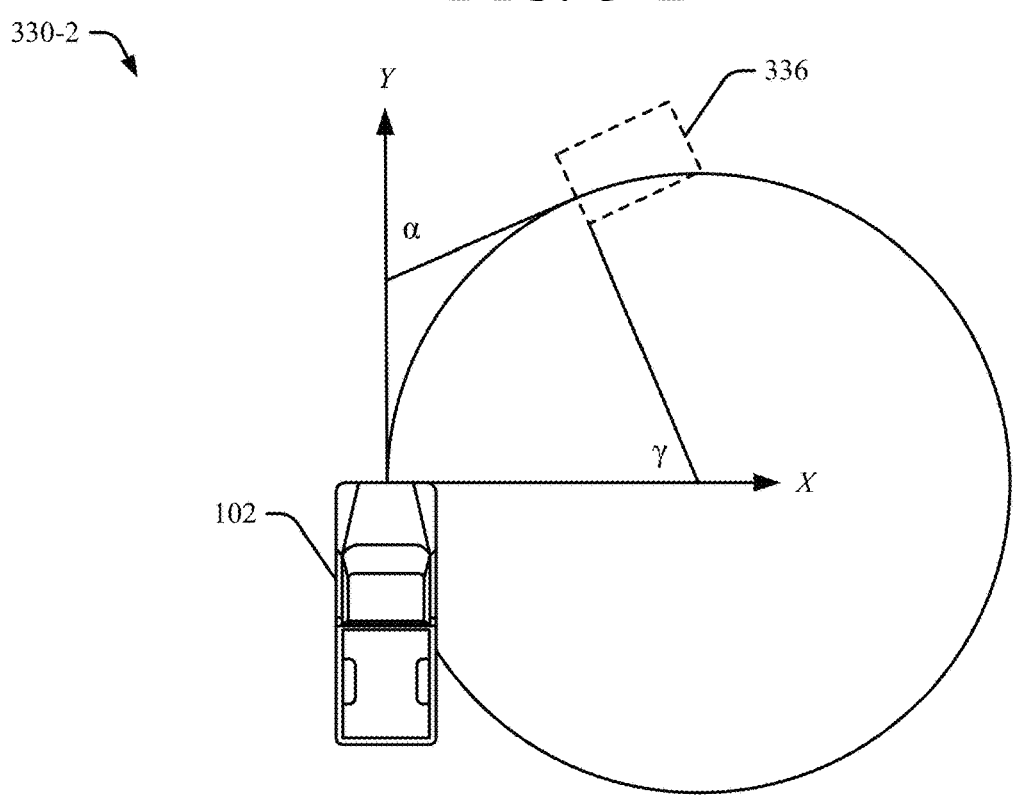

FIG. 3-1 illustrates a flow diagram of an example process 300 for stable radar track velocity initialization using multiple hypotheses. For ease of description, the process 300 is described primarily in the context of being performed by the perception systems 104 and 104-1. Operations (also referred to as steps) of the process 300 are numbered, however, this numbering does not necessarily imply a specific order of operations. The steps of the process 300 may be rearranged, skipped, repeated, or performed in different ways than the specific way it is shown in the diagram of FIG. 3-1. FIG. 3-2 and FIG. 3-3 illustrate example scenarios 330-1 and 330-2 of a host vehicle initializing radar track velocity measurements, in the context of FIG. 3-1. In each example, it is assumed that only a single point from the point cloud sensor data 114 is associated with each detectable object, after four consecutive scans or frames of the radar system 206. One of ordinary skill can easily generalize this example and apply the process 300 to a different scenario where more than one point in the point cloud sensor data 114 is associated with each detectable object, for example, by calculating an average position of all the points within the point cloud sensor data 114 that are associated with a detectable object.

Hypotheses Initialization Period (e.g., Steps 302 Through 308)

In operation, the perception system 104 obtains from the radar system 206, the point cloud sensor data 114 indicative of radar returns that reflect off of objects in the environment 100. Using the point cloud sensor data 114, the perception system 104 establishes a track to the object 106 in the environment including initializing a velocity measurement for the object 106. The perception system 104 may execute the initializer 120 in executing the object tracker 118. When called on by the object tracker 118, the initializer 120 executes the process 300 to initialize the velocity measurement of the object 106.

At 302, hypotheses for at least two different distributions of point cloud sensor data are created. For example, the initializer 120 creates multiple hypotheses for predicted movement of the object 106. There are 2 kinds of information can be used to solve for the initial velocity, as defined by Equation 1 for defining range rate and azimuth angle information, and Equation 2 for defining change of position:

$$v_x \cos(\theta_i) + v_y \sin(\theta_i) = \dot{R}_c, \quad \text{Equation 1}$$

$$\Delta T_i v_x = x_i - x_{i-1}, \Delta T_i v_y = y_i - y_{i-1}, \quad \text{Equation 2}$$

In each of these Equations 1 and 2, the subscript i indicates each different scan, and a constant velocity is assumed within a plurality of scans (e.g., four scans), referred to a scanning period.

Consider FIG. 3-2, the tracks 116 produced for the scenario 330-1 are directed to four different objects in the field of view 108 of the vehicle 102. Each of the tracks 116 includes bounding box dimensions for a different object. The bounding box is based on information inferred from single point observations in the point cloud sensor data 114, over the scanning period, which in this case is four scans. For example, a bounding box 332-1 is derived for a first object based on consecutive points 334-1 and another bounding box 332-2 is derived for a second object using consecutive points 334-2. For a third object and a fourth object in the field of view 108, respectively, a third bounding box 332-3 can be derived from consecutive points 334-3 and a fourth bounding box 332-4 can be derived from consecutive points 334-4.

In this scenario, when determining velocity measurements for each of the objects based on the consecutive, single points observed over the scanning period, various considerations are accounted for. For example, one of the tracks 116 corresponds to the bounding box 332-1; a change of longitudinal position (e.g., as indicated by a X axis) of this track may not be particularly useful in estimating direction or speed, but a change of lateral position (e.g., as indicated by a Y axis) may be useful. For a different one of the tracks 116, the opposite may be true; one of the tracks 116 corresponds to the bounding box 332-2, and a change of lateral position of this track may not be useful for determining velocity, however, a change of longitudinal position may be useful for such estimations. For the third object associated with the bounding box 332-3, a positional change in both directions, e.g., seemingly concurrent changes in lateral and longitudinal position, may be useful to derive an initial velocity estimate for a third track of the tracks 116. In contrast, for the fourth object associated with the bounding box 332-4, a positional change in both directions is not useful to derive an initial velocity estimate for a fourth track of the tracks 116.

This demonstrates that, if an amount of angular separation $\theta_i$ between the consecutive points being used to derive a particular bounding box is too small (e.g., the amount of angular separation $\theta_i$ is less than a separation threshold), then the consecutive points for that bounding box may not be reliable for determining velocity. Likewise, the consecutive points are not useful to estimate velocity, in some cases, even if the amount of angular separation $\theta_i$ is sufficiently large. Velocity $(v_x, v_y)$ of an object can be derived from the consecutive points based on Equation 1, where $v_x$ is a longitudinal velocity of an object, $v_y$ is a lateral velocity of an object, and $\dot{R}_c$ is a radial range rate to the object, compensated for host velocity. As the amount of angular separation $\theta_i$ approaches zero, solving for the velocity $(v_x, v_y)$ is difficult. Even if the amount of angular separation $\theta_i$ is sufficiently large between the consecutive points, inconsistent change in position by some of the points (e.g., when some points span a first edge of an object and the other consecutive points span a second edge that is orthogonal to the first edge) causes the velocity $(v_x, v_y)$ to also be unreliable.

When executed by the processor 110 at 302, the initializer 120 of the object tracker 118 may generate the following seven hypotheses, referred to as Hypothesis 1 to Hypothesis 7:

1. $\Delta T_i v_x = x_i - x_{i-1}, \Delta T_i v_y = y_i - y_{i-1}$;
2. $v_x \cos(\theta_i) + v_y \sin(\theta_i) = \dot{R}_c, \Delta T_i v_x = x_i - x_{i-1}$;
3. $v_x \cos(\theta_i) + v_y \sin(\theta_i) = \dot{R}_c, \Delta T_i v_y = y_i - y_{i-1}$;
4. $v_x \cos(\theta_i) + v_y \sin(\theta_i) = \dot{R}_c, \Delta T_i v_x = x_i - x_{i-1}, \Delta T_i v_y = y_i - y_{i-1}$;
5. Assuming same motion (e.g., curvature) as the vehicle 102 and the object being tracked, $v_x \cos(\theta_i) + v_y \sin(\theta_i) = \dot{R}_c, \Delta T_i v_x = x_i - x^{i-1}, \Delta T_i v_y = y^i - y^{i-1}$;
6. Assuming some radial motion as the vehicle 102 and the object being tracked (e.g., a velocity vector of the object points to a center of a front bumper of the vehicle 102), $v_x \cos(\theta_i) + v_y \sin(\theta_i) = \dot{R}_c, \Delta T_i v_x = x_i - x_{i-1}, \Delta T_i v_y = y_i - y_{i-1}$; and
7. Assuming some cross radial motion between the vehicle 102 and the object being tracked (e.g., a velocity vector of the object points perpendicular to the radial direction), $v_x \cos(\theta_i) + v_y \sin(\theta_i) = \dot{R}_c, \Delta T_i v_x = x_i - x_{i-1}, \Delta T_i v_y = y_i - y_{i-1}$.

An assumption in Hypothesis 5 listed above is that an object is moving on the same road as the vehicle 102, so they are moving with the same motion or curvature. FIG. 3-3 shows a scenario 330-2 where the vehicle 102 has a circular motion and detects an object 336 in a field of view. A motion direction or curvature of the host vehicle 102 can be obtained from a vehicle state estimator (VSE) (e.g., executed by a controller of the vehicle 102). Based on the VSE of the vehicle 102, a motion direction α of the object 336 can easily be computed based on geometry (e.g., α=γ=arcsin $[x_i *\text{curvature}]$).

At 304, an initial velocity for each of the hypotheses is determined. For example, the initializer 120 determines, for each of the multiple hypotheses 212, an initial velocity of that hypothesis. An LLS problem is assigned to each hypothesis as a weighted LLS based on Equations 3 and 4, as shown below, and where diag[·] refers to a corresponding diagonal matrix:

$$\begin{bmatrix} w_1 & 0 & 0 \\ 0 & \ddots & 0 \\ 0 & 0 & w_{3n+4} \end{bmatrix} \begin{bmatrix} \cos\theta_1 & \sin\theta_1 \\ \vdots & \vdots \\ \vdots & \vdots \\ \Delta T_1 & 0 \\ 0 & \Delta T_1 \\ \vdots & \vdots \\ 1 & 0 \\ 0 & 1 \\ 1 & 0 \\ 0 & 1 \\ 1 & 0 \\ 0 & 1 \end{bmatrix} \quad \text{Equation 3}$$

-continued $$\begin{bmatrix} v_x \\ v_y \end{bmatrix} = \begin{bmatrix} w_1 & 0 & 0 \\ 0 & \ddots & 0 \\ 0 & 0 & w_{3n+4} \end{bmatrix} \begin{bmatrix} \text{Range Rate}_1 \\ \vdots \\ x_{k+1} - x_k \\ y_{k+1} - y_k \\ \vdots \\ v_{x1} \\ v_{y1} \\ v_{x2} \\ v_{y2} \\ v_{x3} \\ v_{y3} \end{bmatrix}$$

$$\text{diag} \begin{bmatrix} w_1 \\ w_2 \\ w_3 \\ w_4 \\ w_5 \\ w_6 \\ w_7 \\ w_8 \\ w_9 \\ w_{10} \end{bmatrix} \begin{bmatrix} \cos\theta_1 & \sin\theta_1 \\ \cos\theta_2 & \sin\theta_2 \\ \Delta T_1 & 0 \\ 0 & \Delta T_1 \\ 1 & 0 \\ 0 & 1 \\ 1 & 0 \\ 0 & 1 \\ 1 & 0 \\ 0 & 1 \end{bmatrix} \quad \text{Equation 4}$$

$$\begin{bmatrix} v_x \\ v_y \end{bmatrix} = \text{diag} \begin{bmatrix} w_1 \\ w_2 \\ w_3 \\ w_4 \\ w_5 \\ w_6 \\ w_7 \\ w_8 \\ w_9 \\ w_{10} \end{bmatrix} \begin{bmatrix} \text{Range Rate}_1 \\ \vdots \\ x_{k+1} - x_k \\ y_{k+1} - y_k \\ \vdots \\ v_{x1} \\ v_{y1} \\ v_{x2} \\ v_{y2} \\ v_{x3} \\ v_{y3} \end{bmatrix}$$

The term $(v_{x1}, v_{x1})$ of Equation 3 assumes that the track has the same motion (curvature) as the vehicle 102. The velocity calculated based on the assumption that the track is moving at radial direction is $(v_{x2}, v_{y2})$. The velocity calculated based on the assumption that the track is moving at cross-radial direction is $(v_{x3}, v_{y3})$. The terms $(v_{x1}, v_{y1})$, $(v_{x2}, v_{y2})$ and $(v_{x3}, v_{y3})$ are only used as regularization. In practice, these terms may have small weightages when compared to other information. Practical values of these weights $w_{3n-1}, w_{3n}, w_{3n+1}, w_{3n+2}, w_{3n+3}, w_{3n+4}$ are approximately one tenth of the smallest weights of any other information.

Equation 4 shows data from two consecutive cycles. The weights are the inverse of variances and can be obtained from sensor specifications or data mining. Equation 4 shows that solving different hypotheses is equivalent to setting different weights to zero while keeping the others. For example, the Hypothesis 2 listed above is equivalent to zeroing the terms $w_5, w_6, w_7, w_8, w_9$, and $w_{10}$ in Equation 4, while setting the terms $w_1, w_2$ as the inverse of the range rate variance, and while computing the terms $w_3, w_4$ based on range and azimuth angle variances. For $$w_1 = w_2 = \frac{1}{\sigma_{rr}^2},$$

where $\sigma_{rr}^2$ is the range rate variance from sensor specification. For $w_3$ and all weights related to change of longitudinal position, it can be calculated by the inverse of the sum of longitudinal position variances of 2 consecutive scans. For $$w_3 = \frac{1}{\sigma_{x_k}^2 + \sigma_{x_{k+1}}^2},$$

$$\sigma_{x_k}^2 = \sigma_\theta^2 * y_k + (\cos(\theta_k))^2 * \sigma_r^2 + \sigma_p^2.$$

Where $\sigma_\theta^2$ is the azimuth angle variance from sensor specification, $\sigma_r^2$ is the rate variance from sensor specification, $\sigma_p^2$ a is a tunable constant representing the uncertainty of a scattering center of the radar point cloud. Same for $w_4$ and all weights related to change of lateral position, it can be calculated by the inverse of the sum of lateral position variances of 2 consecutive scans. For $$w_4 = \frac{1}{\sigma_{y_k}^2 + \sigma_{y_{k+1}}^2},$$

$$\sigma_{y_k}^2 = \sigma_\theta^2 * x_k + (\sin(\theta_k))^2 * \sigma_r^2 + \sigma_p^2.$$

Velocity of each hypothesis can be obtained by solving Equation 3. Position can also be estimated using the velocity solved from Equation 3, and the Equations 5 and 6, which assume a nearly constant velocity during the scanning period (e.g., four or more consecutive cycles for each hypothesis).

$$\begin{cases} x_{est_i} = x_i + \Delta T_{i \to 4} v_x \\ y_{est_i} = y_i + \Delta T_{i \to 4} v_y \end{cases} \quad \text{Equation 5}$$

$$\begin{cases} x_{est} = \frac{\Sigma_i x_{est\_i}}{4} \\ y_{est} = \frac{\Sigma_i y_{est\_i}}{4} \end{cases} \quad \text{Equation 6}$$

At 306, a track error associated with each of the hypotheses is determined. For example, the initializer 120 determines, for each of the multiple hypotheses 212, a first associated level of evidence supporting the initial velocity of that hypothesis. The level of evidence is based on the track error scores, which are computed as accumulated position and range rate errors with a point or points from the point cloud sensor data 114 associated with one of the tracks 116. The track error scores can be determined from Equation 7. In Equation 7, $\Delta x_r$ is the position error in range direction (e.g., azimuth angle), $\Delta x_o$ is the position error in the direction perpendicular to the range direction, $\Delta \dot{r}$ is the range rate error between the hypothesis and the related point or points from the point cloud sensor data 114. If multiple points from the point cloud sensor data 114 correlate to a track, an average position and range rate can be used. $\beta_r, \beta_o, \beta_{rr}$ are the weights for difference errors.

$$\text{Score}_{err} = \beta_r \Delta x_r + \beta_o \Delta x_o + \beta_{rr} \Delta \dot{r} \quad \text{Equation 7}$$

At this step, track error score is calculated using the latest radar point cloud.

At 308, another hypothesis is associated with the hypotheses by fusing all the hypothesis initially created into one, fused hypothesis. For example, the initializer 120 generates a fused hypothesis by combining the multiple hypotheses 212 into one. An initial velocity and a first associated level of evidence of the fused hypothesis may be based on an aggregate of the initial velocities and the first associated levels of evidence of the multiple hypotheses. The initializer 120 then includes the fused hypothesis among the multiple hypotheses 212.

For instance, all seven of the Hypotheses 1 to 7 can be fused to create a new hypothesis, which is referred to as Hypothesis 8. Following Equations 8 and 9, the Hypothesis 8 is determined. In Equation 8, the term $X_i^{mh}$ is i-th hypothesis generated at 302, and in Equation 9, the weight for that hypothesis is computed as the evidence E. The term $X^F$ in Equation 8 is the fused hypothesis (e.g., Hypothesis 8) that results from summation of the weighted hypotheses.

$$X^F = \sum_i E_i X_i^{mh} \qquad \text{Equation 8}$$

$$E = \frac{1}{\text{Score}_{err}} \qquad \text{Equation 9}$$

Following step 308 the hypothesis initialization period is ended, and all eight hypotheses are generated with initial positions, initial velocities, and initial track error scores.

Hypotheses Tracking Period (e.g., Steps 310 Through 324)

The hypotheses tracking period includes steps 310 through 324, and by definition, is a time period after the hypothesis initialization period and before the track is set to a mature status and finally initialized. Prior to finally initializing and outputting a new track among the tracks 116, which are mature, a new track is tracked similarly, but not reported among the tracks 116, until the new track is stable and ready for reporting.

At 310, a best hypothesis from the hypotheses is selected to estimate a velocity measurement for a track. A temporary track state for the new track that enables tracking during this time may be set to the best hypothesis so far (e.g., the hypothesis with a lowest track error score). For instance, to enable tracking until maturity, the initializer 120 initializes a velocity measurement of each new track before it can enter a hypotheses tracking period for that track. Responsive to including the fused hypothesis among the multiple hypotheses 212, the initializer 120 selects, based on the first associated levels of evidence for the multiple hypotheses 212, a first best hypothesis.

At 312, the hypotheses are time updated. During the hypotheses tracking period, each hypothesis may be tracked using a Kalman Filter with a constant-velocity motion model, which enables the initializer 120 to solve each hypothesis for a current cycle time of the hypotheses tracking period. The initializer 120 time updates the initial velocity of each of the multiple hypotheses 212.

At 314, the track score associated with each of the hypotheses is updated. During the hypotheses tracking period, data association is performed for the track to determine the track error scores for the hypotheses. For example, prior to accumulating the track error score for each hypothesis, data association between the track and an associated point or points from the point cloud sensor data 114 can be used to compute the track error score of each hypothesis using Equation 7. For instance, the initializer 120 determines, for each of the multiple hypotheses 212, a second associated level of evidence supporting the updated initial velocity of that hypothesis.

At 316, any of the hypotheses that do not satisfy an evidence threshold are terminated. For example, the initializer 120 eliminates from the multiple hypotheses 212 any having values for the second associated level of evidence that do not satisfy an evidence threshold. The evidence threshold includes an evidence ratio computed for each of the multiple hypotheses. The evidence ratio computed for each of the multiple hypotheses can be a unique evidence ratio among all the multiple hypotheses. The evidence ratio for each hypothesis can be determined from Equation 10:

$$\rho_{Ei} = \frac{E_i}{\sum_n E_n} \qquad \text{Equation 10}$$

If the evidence ratio $\rho_{Ei}$ for a hypothesis is smaller than an evidence threshold the initializer 120 terminates the hypothesis. The evidence threshold may be determined using Equation 11:

$$\rho_{th} = \frac{0.25}{(N_{valid} - 1)} \qquad \text{Equation 11}$$

In Equation 11, $N_{valid}$ represents the number of hypotheses still active (i.e., not terminated) during the current cycle time of the hypotheses tracking period. If none of the hypotheses has an evidence ratio smaller than the evidence threshold $\rho_{th}$, then the initializer 120 can attempt to terminate a single hypothesis with a smallest evidence ratio, however, this may be conditioned on its evidence ratio being smaller than $2*\rho_{th}$. If termination of a hypothesis with a smallest evidence ration is not appropriate, no hypothesis is terminated in the current cycle time of the hypotheses tracking period.

At 318, whether there is enough evidence from the hypotheses to initialize the track is determined. In other words, the initializer 120 checks whether sufficient evidence exists to finally initialize the track using one of the hypotheses. The initializer 120 may use one or more criteria for checking whether the evidence for any of the hypotheses is sufficient to finalize the velocity measurement initialization. One criterion may be that the hypotheses tracking period is ended. The duration of the hypotheses tracking period may depends on a specific application, however, because this period adds delay in the track initialization, a suitable duration may be different from one vehicle or implementation to the next. An example, duration is equivalent to eight radar scans in a twenty hertz system. Another criterion may be that there are only two hypotheses still active; all but two hypotheses are terminated up to now. A third criterion can be that there are only three hypotheses alive and all of them have evidence ratio $\rho_{Ei}$ larger than 0.3, which indicates that all three hypotheses produce similar results. The process 300 arrives at 324, when at 318, it is determined that sufficient evidence exists (e.g., at least one criteria is satisfied), and the process 300 carries on to 320, when at 318, it is determined that insufficient evidence exists (e.g., none of the criteria is satisfied).

At 320, the remaining hypotheses are measurement updated. For example, responsive to determining that more than two remain in the multiple hypotheses 212, after eliminating any having values for the second associated levels of evidence that do not satisfy the evidence threshold, the initializer 120 measurement updates the predicted movement of the object for each of the remaining multiple hypotheses 212.

As indicated above at 312, during the hypotheses tracking period, each hypothesis may be tracked using a Kalman Filter with a constant-velocity motion model, which enables the initializer 120 to solve each hypothesis for a current cycle time of the hypotheses tracking period. At 320, each hypothesis is measurement updated using the information derived from the point cloud sensor data 114, which is associated to the track.

At 322, which is similar to step 310, a best hypothesis from the hypotheses is selected to be used as the track state for the new track to further enable tracking during the hypotheses tracking period. This temporary track state enables the data association to occur during the hypotheses tracking period. For example, responsive to determining that more than two remain in the multiple hypotheses 212, after eliminating any having values for the second associated levels of evidence that do not satisfy the evidence threshold, the initializer 120 selects, based on the second associated levels of evidence for the remaining multiple hypotheses 212, a second best hypothesis to replace the first best hypothesis selected previously.

At 324, the best hypothesis is used to initialize the velocity measurement for the track. If the conditions at 318 indicate the evidence is sufficient, the track state will be initialized using the best hypothesis. For example, responsive to determining that only two hypotheses remain in the multiple hypotheses 212 after eliminating any having values for the second associated levels of evidence that do not satisfy the evidence threshold, the initializer 120 selects, based on the second associated levels of evidence for the two hypotheses that remain, a third best hypothesis to replace the first or second best hypothesis selected previously.

During the hypotheses tracking period, the new track is measurement updated and track errors are recomputed, until the new track reaches maturity, when it is then reported among the tracks 116. A flag may prevent the new track from being included and output among the tracks 116. When the flag indicates that the new track is initialized and otherwise ready for inclusion in an output from the perception system 104, the new track is added to the tracks 116. At 324, the object tracker 118 and/or the initializer 120 may change the flag to indicate the new track is mature and ready for inclusion among the tracks 116. For example, the object tracker 118 may cause the perception system 104 to output, for the vehicle-based systems 210, the track to the object including a velocity parameter initialized to the initial velocity of the third best hypothesis.

Example Results

Figure 4:
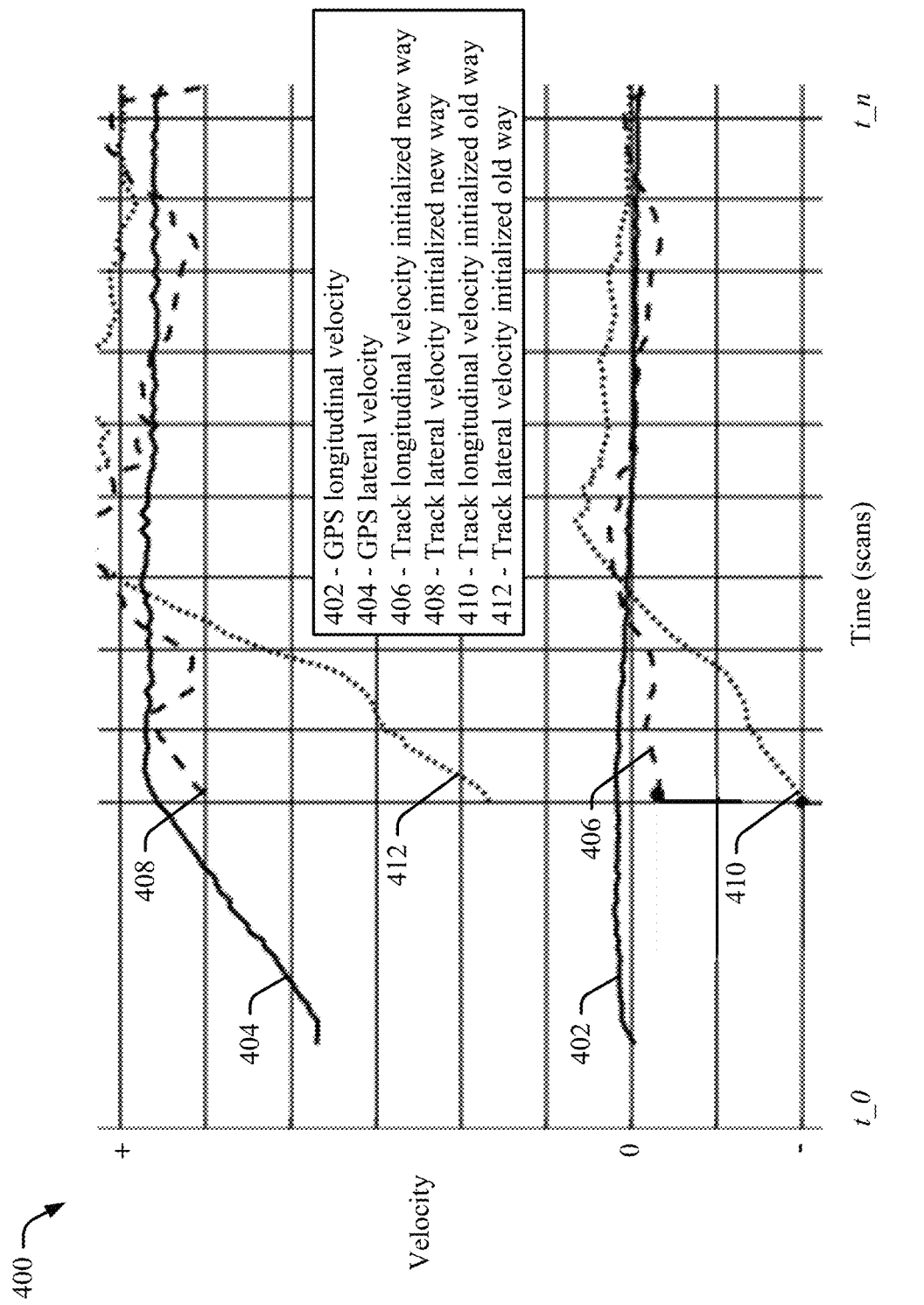
FIG. 4 illustrates a graph of velocity measurement initializations during a time period of stable radar track velocity initialization using multiple hypotheses.

FIG. 4 illustrates a graph 400 of velocity measurement initializations during a time period of stable radar track velocity initialization using multiple hypotheses. The results of the graph 400 come from performance testing a perception system, such as the perception system 104, as an object makes a straight crossing path across a host vehicle travel path. In the graph 400, lines 402 and 404 show a global positioning system (GPS) reported longitudinal and lateral velocity, respectively. The lines 402 and 404 represent a true velocity of the object. Lines 410 and 412 track the longitudinal and lateral velocity, respectively, when initialized using previous track velocity initialization techniques (i.e., the old way, without using multiple hypotheses). In contrast, lines 406 and 408 show distinct advantages from using multiple hypotheses to initialize velocity measurements (i.e., the new way). The lines 406 and 408 show the longitudinal and lateral velocities being tracked from using multiple hypotheses, which allows the track velocities to settle to values much closer to the true velocity (e.g., the lines 402 and 404), in less time and/or with less variance, which causes the results to be more stable than the lines 410 and 412. As the object travels somewhat perpendicular to the travel path of the host vehicle, comparing the lines 406 and 408 relative to the lines 410 and 412 shows that the example perception system is able to achieve velocity track initialization as fast or nearly as fast as other velocity initialization techniques, but with much higher accuracy relative to the lines 402 and 404.

Further Examples

Some further examples in view of the techniques described above include:

Example 1. A system comprising a processor configured to: obtain point cloud sensor data indicative of signal returns that reflect off of objects in an environment; and establish, using the point cloud sensor data, a track to an object in the environment including initializing a velocity measurement for the object by: creating multiple hypotheses for predicted movement of the object; determining, for each of the multiple hypotheses, an initial velocity and a first associated level of evidence supporting the initial velocity of that hypothesis; generating a fused hypothesis by combining the multiple hypotheses, an initial velocity and a first associated level of evidence of the fused hypothesis being based on an aggregate of the initial velocities and the first associated levels of evidence of the multiple hypotheses; including the fused hypothesis among the multiple hypotheses; and responsive to including the fused hypothesis among the multiple hypotheses, select, based on the first associated levels of evidence for the multiple hypotheses, a first best hypothesis; time update the initial velocity of each of the multiple hypotheses; determine, for each of the multiple hypotheses, a second associated level of evidence supporting the updated initial velocity of that hypothesis; eliminate from the multiple hypotheses any of the multiple hypotheses having values for the second associated level of evidence that do not satisfy an evidence threshold; responsive to determining that more than two hypotheses remain in the multiple hypotheses after eliminating any of the multiple hypotheses having values for the second associated levels of evidence that do not satisfy the evidence threshold: measurement update the predicted movement of the object for each of the remaining multiple hypotheses; and select, based on the second associated levels of evidence for the remaining multiple hypotheses, a second best hypothesis to replace the first best hypothesis selected previously; and responsive to determining that only two hypotheses remain in the multiple hypotheses after eliminating any of the multiple hypotheses having values for the second associated levels of evidence that do not satisfy the evidence threshold: select, based on the second associated levels of evidence for the two hypotheses that remain, a third best hypothesis to replace the first or second best hypothesis selected previously; and output, for a vehicle system, the track to the object including a velocity parameter initialized to the initial velocity of the third best hypothesis.

Example 2. The system of any other example, wherein the processor is further configured to, until only two hypotheses remain: time update the initial velocity of each of the multiple hypotheses; determine, for each of the multiple hypotheses, the second associated level of evidence supporting the updated initial velocity of that hypothesis; and eliminate from the multiple hypotheses any of the multiple hypotheses having values for the second associated level of evidence that do not satisfy the evidence threshold.

Example 3. The system of any other example, wherein the second best hypothesis to replace the first best hypothesis selected previously is selected further in response to determining a hypotheses tracking period ends.

Example 4. The system of any other example, wherein the hypotheses tracking period of time comprises multiple frames of a radar system from which the point cloud sensor data is obtained.

Example 5. The system of any other example, wherein the hypotheses tracking period of time comprises approximately fifteen frames of the radar system.

Example 6. The system of any other example, wherein the processor is configured to determine, for each of the multiple hypotheses, the first associated level of evidence supporting the initial velocity of that hypothesis by determining accumulated position and range rate errors of one or more points of the point cloud sensor data.

Example 7. The system of any other example, wherein the processor is configured to use a constant motion model to time update or to measurement update the multiple hypotheses.

Example 8. The system of any other example, wherein the evidence threshold comprises an evidence ratio computed for each of the multiple hypotheses.

Example 9. The system of any other example, wherein the evidence ratio computed for each of the multiple hypotheses comprises a unique evidence ratio among all the multiple hypotheses.

Example 10. The system of any other example, wherein the point cloud sensor data comprises point cloud radar data.

Example 11. A method, comprising: obtaining, by an object tracker and from a radar system, point cloud sensor data indicative of radar returns that reflect off of objects in an environment; and establishing, using the point cloud sensor data, a track to an object in the environment including initializing a velocity measurement for the object by: creating multiple hypotheses for predicted movement of the object; determining, for each of the multiple hypotheses, an initial velocity and a first associated level of evidence supporting the initial velocity of that hypothesis; generating a fused hypothesis by combining the multiple hypotheses, an initial velocity and a first associated level of evidence of the fused hypothesis being based on an aggregate of the initial velocities and the first associated levels of evidence of the multiple hypotheses; including the fused hypothesis among the multiple hypotheses; and responsive to including the fused hypothesis among the multiple hypotheses, selecting, based on the first associated levels of evidence for the multiple hypotheses, a first best hypothesis for initializing the velocity measurement for the object.

Example 12. The method of any other example, further comprising time updating the initial velocity of each of the multiple hypotheses; determining, for each of the multiple hypotheses, a second associated level of evidence supporting the updated initial velocity of that hypothesis; eliminating from the multiple hypotheses any of the multiple hypotheses having values for the second associated level of evidence that do not satisfy an evidence threshold; responsive to determining that more than two hypotheses remain in the multiple hypotheses after eliminating any of the multiple hypotheses having values for the second associated levels of evidence that do not satisfy the evidence threshold: measurement updating the predicted movement of the object for each of the remaining multiple hypotheses; and selecting, based on the second associated levels of evidence for the remaining multiple hypotheses, a second best hypothesis to replace the first best hypothesis selected previously.

Example 13. The method of any other example, further comprising time updating the initial velocity of each of the multiple hypotheses; determining, for each of the multiple hypotheses, a second associated level of evidence supporting the updated initial velocity of that hypothesis; eliminating from the multiple hypotheses any of the multiple hypotheses having values for the second associated level of evidence that do not satisfy an evidence threshold; responsive to determining that only two hypotheses remain in the multiple hypotheses after eliminating any of the multiple hypotheses having values for the second associated levels of evidence that do not satisfy the evidence threshold: selecting, based on the second associated levels of evidence for the two hypotheses that remain, a third best hypothesis to replace the first or second best hypothesis selected previously; and outputting, for a vehicle system, the track to the object including a velocity parameter initialized to the initial velocity of the third best hypothesis.

Example 14. The method of any other example, further comprising time updating the initial velocity of each of the multiple hypotheses; determining, for each of the multiple hypotheses, a second associated level of evidence supporting the updated initial velocity of that hypothesis; eliminating from the multiple hypotheses any of the multiple hypotheses having values for the second associated level of evidence that do not satisfy an evidence threshold; responsive to determining that more than two hypotheses remain in the multiple hypotheses after eliminating any of the multiple hypotheses having values for the second associated levels of evidence that do not satisfy the evidence threshold: measurement updating the predicted movement of the object for each of the remaining multiple hypotheses; and selecting, based on the second associated levels of evidence for the remaining multiple hypotheses, a second best hypothesis to replace the first best hypothesis selected previously; and responsive to determining that only two hypotheses remain in the multiple hypotheses after eliminating any of the multiple hypotheses having values for the second associated levels of evidence that do not satisfy the evidence threshold: selecting, based on the second associated levels of evidence for the two hypotheses that remain, a third best hypothesis to replace the first or second best hypothesis selected previously; and outputting, for a vehicle system, the track to the object including a velocity parameter initialized to the initial velocity of the third best hypothesis.

Example 15. The method of any other example, wherein the second best hypothesis to replace the first best hypothesis selected previously is selected further in response to determining a hypotheses tracking period of time is expired.

Example 16. The method of any other example, wherein the hypotheses tracking period of time comprises multiple frames of the radar system.

Example 17. The method of any other example, wherein the evidence threshold comprises a unique evidence ratio computed for each of the multiple hypotheses.

Example 18. The method of any other example, wherein the object tracker is configured to determine, for each of the multiple hypotheses, the first associated level of evidence supporting the initial velocity of that hypothesis by determining accumulated position and range rate errors of an associated portion of the point cloud sensor data.

Example 19. The method of any other example, wherein the object tracker is configured to use a constant motion model to time update or to measurement update the multiple hypotheses.

Example 20

A computer-readable storage medium comprising instructions that, when executed, cause a processor to execute an object tracker configured to: obtain, from a radar system, point cloud sensor data indicative of radar returns that reflect off of objects in an environment; and establish, using the point cloud sensor data, a track to the object in an environment including initializing a velocity measurement for the object by: creating at least two hypotheses for predicted movement of the object; determining, for each of the at least two hypotheses, an initial velocity and a first associated level of evidence supporting the initial velocity of that hypothesis; generating a fused hypothesis by combining the at least two hypotheses, an initial velocity and a first associated level of evidence of the fused hypothesis being based on an aggregate of the initial velocities and the first associated levels of evidence of the at least two hypotheses; including the fused hypothesis among the at least two hypotheses; and responsive to including the fused hypothesis among the at least two hypotheses, selecting, based on the first associated levels of evidence for the at least two hypotheses, a single best hypothesis for initializing the velocity measurement for the object.

Example 21. A system comprising means for performing the method of any previous example.

Example 22. A system comprising a processor configured to perform the method of any previous example.

Example 23

A computer readable medium including instructions that, when executed, cause a processor to perform the method of any previous example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with stable radar track velocity initialization can occur in other systems (e.g., image systems, lidar systems, ultrasonic systems) that identify and process tracks from a variety of sensors. Therefore, although described to improve radar tracking, the techniques of the foregoing description can be adapted and applied to other problems to effectively detect and track objects in a scene using other types of object trackers.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

We claim:

1. A device comprising a processor configured to:
obtain point cloud sensor data indicative of signal returns that reflect off of objects in an environment; and
establish, using the point cloud sensor data, a track to an object in the environment including initializing a velocity measurement for the object by:
creating multiple hypotheses for predicted movement of the object;
determining a track error score for each hypothesis of the multiple hypotheses, the track error score being computed as accumulated position and range rate errors associated with one or more points of the point cloud sensor data associated with the track;
determining, for each of the multiple hypotheses, an initial velocity and a first associated level of evidence supporting the initial velocity of that hypothesis, the first associated level of evidence corresponding to the track error score of that hypothesis;
generating a fused hypothesis by combining the multiple hypotheses, an initial velocity and a first associated level of evidence of the fused hypothesis being based on an aggregate of the initial velocities and the first associated levels of evidence of the multiple hypotheses;
including the fused hypothesis among the multiple hypotheses; and
responsive to including the fused hypothesis among the multiple hypotheses, select, based on the first associated levels of evidence for the multiple hypotheses, a first best hypothesis, the first best hypothesis having a lowest associated track error score from among the multiple hypotheses;
time update the initial velocity of each of the multiple hypotheses;
determine, for each of the multiple hypotheses, a second associated level of evidence supporting the updated initial velocity of that hypothesis, the second associated level of evidence corresponding to an updated track error score of that hypothesis;
eliminate from the multiple hypotheses any of the multiple hypotheses having values for the second associated level of evidence that do not satisfy an evidence threshold;
responsive to determining that more than two hypotheses remain in the multiple hypotheses after eliminating any of the multiple hypotheses having values for the second associated levels of evidence that do not satisfy the evidence threshold:
measurement update the predicted movement of the object for each of the remaining multiple hypotheses; and
select, based on the second associated levels of evidence for the remaining multiple hypotheses, a second best hypothesis to replace the first best hypothesis selected previously, the second best hypothesis having the lowest associated track error score of the remaining multiple hypotheses after the measurement update; and
responsive to determining that only two hypotheses remain in the multiple hypotheses after eliminating any of the multiple hypotheses having values for the second associated levels of evidence that do not satisfy the evidence threshold:
select, based on the second associated levels of evidence for the two hypotheses that remain, a third best hypothesis to replace the first or second best hypothesis selected previously, the third best hypothesis having the lowest associated track error score of the two hypotheses that remain; and
output, for a vehicle system, the track to the object including a velocity parameter initialized to the initial velocity of the third best hypothesis.

2. The device of claim 1, wherein the processor is further configured to, until only two hypotheses remain:

time update the initial velocity of each of the multiple hypotheses;
determine, for each of the multiple hypotheses, the second associated level of evidence supporting the updated initial velocity of that hypothesis; and
eliminate from the multiple hypotheses any of the multiple hypotheses having values for the second associated level of evidence that do not satisfy the evidence threshold.

3. The device of claim 1, wherein the second best hypothesis to replace the first best hypothesis selected previously is selected further in response to determining a hypotheses tracking period ends.

4. The device of claim 3, wherein the hypotheses tracking period of time comprises multiple frames of a radar system from which the point cloud sensor data is obtained.

5. The device of claim 4, wherein the hypotheses tracking period of time comprises approximately fifteen frames of the radar system.

6. The device of claim 1, wherein the processor is configured to determine, for each of the multiple hypotheses, the first associated level of evidence supporting the initial velocity of that hypothesis by determining accumulated position and range rate errors of one or more points of the point cloud sensor data.

7. The device of claim 1, wherein the processor is configured to use a constant motion model to time update or to measurement update the multiple hypotheses.

8. The device of claim 1, wherein the evidence threshold comprises an evidence ratio computed for each of the multiple hypotheses.

9. The device of claim 8, wherein the evidence ratio computed for each of the multiple hypotheses comprises a unique evidence ratio among all the multiple hypotheses.

10. The device of claim 1, wherein the point cloud sensor data comprises point cloud radar data.

11. A method, comprising:
obtaining, by an object tracker and from a radar system, point cloud sensor data indicative of radar returns that reflect off of objects in an environment; and
establishing, using the point cloud sensor data, a track to an object in the environment including initializing a velocity measurement for the object by:
creating multiple hypotheses for predicted movement of the object;
determining a track error score for each hypothesis of the multiple hypotheses, the track error score being computed as accumulated position and range rate errors associated with one or more points of the point cloud sensor data associated with the track;
determining, for each of the multiple hypotheses, an initial velocity and a first associated level of evidence supporting the initial velocity of that hypothesis, the first associated level of evidence corresponding to the track error score of that hypothesis;
generating a fused hypothesis by combining the multiple hypotheses, an initial velocity and a first associated level of evidence of the fused hypothesis being based on an aggregate of the initial velocities and the first associated levels of evidence of the multiple hypotheses;
including the fused hypothesis among the multiple hypotheses; and
responsive to including the fused hypothesis among the multiple hypotheses, selecting, based on the first associated levels of evidence for the multiple hypotheses, a first best hypothesis for initializing the velocity measurement for the object, the first best hypothesis having a lowest associated track error score from among the multiple hypotheses.

12. The method of claim 11, further comprising
time updating the initial velocity of each of the multiple hypotheses;
determining, for each of the multiple hypotheses, a second associated level of evidence supporting the updated initial velocity of that hypothesis, the second associated level of evidence corresponding to an updated track error score of that hypothesis;
eliminating from the multiple hypotheses any of the multiple hypotheses having values for the second associated level of evidence that do not satisfy an evidence threshold;
responsive to determining that more than two hypotheses remain in the multiple hypotheses after eliminating any of the multiple hypotheses having values for the second associated levels of evidence that do not satisfy the evidence threshold:
measurement updating the predicted movement of the object for each of the remaining multiple hypotheses; and
selecting, based on the second associated levels of evidence for the remaining multiple hypotheses, a second best hypothesis to replace the first best hypothesis selected previously, the second best hypothesis having the lowest associated track error score of the remaining multiple hypotheses after the measurement update.

13. The method of claim 11, further comprising
time updating the initial velocity of each of the multiple hypotheses;
determining, for each of the multiple hypotheses, a second associated level of evidence supporting the updated initial velocity of that hypothesis, the second associated level of evidence corresponding to an updated track error score of that hypothesis;
eliminating from the multiple hypotheses any of the multiple hypotheses having values for the second associated level of evidence that do not satisfy an evidence threshold;
responsive to determining that only two hypotheses remain in the multiple hypotheses after eliminating any of the multiple hypotheses having values for the second associated levels of evidence that do not satisfy the evidence threshold:
selecting, based on the second associated levels of evidence for the two hypotheses that remain, a third best hypothesis to replace the first or second best hypothesis selected previously, the third best hypothesis having the lowest associated track error score of the two hypotheses that remain; and
outputting, for a vehicle system, the track to the object including a velocity parameter initialized to the initial velocity of the third best hypothesis.

14. The method of claim 11, further comprising
time updating the initial velocity of each of the multiple hypotheses;
determining, for each of the multiple hypotheses, a second associated level of evidence supporting the updated initial velocity of that hypothesis, the second associated level of evidence corresponding to an updated track error score of that hypothesis;

eliminating from the multiple hypotheses any of the multiple hypotheses having values for the second associated level of evidence that do not satisfy an evidence threshold;

responsive to determining that more than two hypotheses remain in the multiple hypotheses after eliminating any of the multiple hypotheses having values for the second associated levels of evidence that do not satisfy the evidence threshold:

measurement updating the predicted movement of the object for each of the remaining multiple hypotheses; and selecting, based on the second associated levels of evidence for the remaining multiple hypotheses, a second best hypothesis to replace the first best hypothesis selected previously, the second best hypothesis having the lowest associated track error score of the remaining multiple hypotheses after the measurement update; and responsive to determining that only two hypotheses remain in the multiple hypotheses after eliminating any of the multiple hypotheses having values for the second associated levels of evidence that do not satisfy the evidence threshold:

selecting, based on the second associated levels of evidence for the two hypotheses that remain, a third best hypothesis to replace the first or second best hypothesis selected previously, the third best hypothesis having the lowest associated track error score of the two hypotheses that remain; and outputting, for a vehicle system, the track to the object including a velocity parameter initialized to the initial velocity of the third best hypothesis.

15. The method of claim 14, wherein the second best hypothesis to replace the first best hypothesis selected previously is selected further in response to determining a hypotheses tracking period of time is expired.

16. The method of claim 15, wherein the hypotheses tracking period of time comprises multiple frames of the radar system.

17. The method of claim 14, wherein the evidence threshold comprises a unique evidence ratio computed for each of the multiple hypotheses.

18. The method of claim 11, wherein the object tracker is configured to determine, for each of the multiple hypotheses, the first associated level of evidence supporting the initial velocity of that hypothesis by determining accumulated position and range rate errors of an associated portion of the point cloud sensor data.

19. The method of claim 11, wherein the object tracker is configured to use a constant motion model to time update or to measurement update the multiple hypotheses.

20. A non-transitory computer-readable storage medium comprising instructions that, when executed, cause a processor to execute an object tracker configured to:

obtain, from a radar system, point cloud sensor data indicative of radar returns that reflect off of objects in an environment; and establish, using the point cloud sensor data, a track to the object in an environment including initializing a velocity measurement for the object by:

creating at least two hypotheses for predicted movement of the object;

determining a track error score for each hypothesis of the multiple hypotheses, the track error score being computed as accumulated position and range rate errors associated with one or more points of the point cloud sensor data associated with the track;

determining, for each of the at least two hypotheses, an initial velocity and a first associated level of evidence supporting the initial velocity of that hypothesis, the first associated level of evidence corresponding to the track error score of that hypothesis;

generating a fused hypothesis by combining the at least two hypotheses, an initial velocity and a first associated level of evidence of the fused hypothesis being based on an aggregate of the initial velocities and the first associated levels of evidence of the at least two hypotheses;

including the fused hypothesis among the at least two hypotheses; and responsive to including the fused hypothesis among the at least two hypotheses, selecting, based on the first associated levels of evidence for the at least two hypotheses, a single best hypothesis for initializing the velocity measurement for the object, the first best hypothesis having a lowest associated track error score from among the multiple hypotheses.

* * * * *